United States Patent

Liubakka et al.

[11] Patent Number: 6,167,334

[45] Date of Patent: Dec. 26, 2000

[54] METHOD AND APPARATUS FOR PROVIDING VARIABLE ASSIST POWER STEERING

[75] Inventors: Michael Kenneth Liubakka, Livonia; Robert Charles Baraszu; Ronald Joseph Collins, both of Dearborn, all of Mich.

[73] Assignee: Ford Global Technologies, Inc., Dearborn, Mich.

[21] Appl. No.: 09/226,234

[22] Filed: Jan. 5, 1999

[51] Int. Cl.⁷ .................................................. B62D 5/065
[52] U.S. Cl. .............................................. 701/42; 180/422
[58] Field of Search ................................ 701/41, 42, 43; 180/417, 421, 422, 446

[56] References Cited

U.S. PATENT DOCUMENTS

| | | | |
|---|---|---|---|
| 4,621,833 | 11/1986 | Soltis | 280/5.51 |
| 4,666,011 | 5/1987 | Ohe et al. | 180/446 |
| 4,715,461 | 12/1987 | Shimizu | 180/446 |
| 4,715,463 | 12/1987 | Shimizu | 180/446 |
| 4,800,974 | 1/1989 | Wand et al. | 180/446 |
| 4,819,170 | 4/1989 | Shimizu | 701/41 |
| 4,828,065 | 5/1989 | Ishihara et al. | 180/442 |
| 5,029,660 | 7/1991 | Raad et al. | 180/422 |
| 5,201,818 | 4/1993 | Nishimoto | 180/446 |
| 5,257,828 | 11/1993 | Miller et al. | 180/446 |
| 5,265,019 | 11/1993 | Hararra et al. | 701/41 |
| 5,475,289 | 12/1995 | McLaughlin et al. | 318/432 |
| 5,513,720 | 5/1996 | Yamamoto et al. | 180/421 |
| 5,528,497 | 6/1996 | Yamamoto et al. | 701/41 |
| 5,553,683 | 9/1996 | Wenzel et al. | 180/417 |
| 5,568,389 | 10/1996 | McLaughlin et al. | 701/41 |
| 5,623,409 | 4/1997 | Miller | 701/41 |
| 5,709,281 | 1/1998 | Sherwin et al. | 180/272 |
| 5,711,394 | 1/1998 | Fujii et al. | 180/422 |
| 5,743,351 | 4/1998 | McLaughlin | 180/446 |
| 5,749,431 | 5/1998 | Peterson | 180/422 |

*Primary Examiner*—William A. Cuchlinski, Jr.
*Assistant Examiner*—Edward Pipala
*Attorney, Agent, or Firm*—Gregory P. Brown

[57] ABSTRACT

A variable assist power steering system (10) uses vehicle speed, steering wheel rate and steering valve inlet pressure to vary the steering assist provided. A control module (30) receives vehicle speed, steering wheel rate and pressure data from sensors (24, 25, 26) and produces a control signal for a flow control valve actuator (32) that bypasses fluid flow from the pump (22) to a reservoir (36), rather than to the steering valve (20) thereby affecting steering valve pressure which controls the rack piston (16) which changes the angle of the front vehicle wheels used for steering. The control module (30) employs first and second calibration tables (38, 40) to determine the control signal that ensures adequate flow while consuming the least amount of energy.

6 Claims, 5 Drawing Sheets

4 6,167,334

METHOD AND APPARATUS FOR PROVIDING VARIABLE ASSIST POWER STEERING

FIELD OF THE INVENTION

This invention relates generally to vehicles, and, more particularly, to vehicle power steering systems for varying the amount of steering assist provided.

BACKGROUND OF THE INVENTION

The amount of force output required by a steering system is proportional to the lateral load on the front axle. At speed, the lateral load is generated primarily by the lateral acceleration of the vehicle. The force output of the power steering system is generated by the assist pressure and force input by the driver. The type of steering maneuver a vehicle is performing can be determined by observing the assist pressure, its change with time, the rate at which the steering wheel is being turned and the vehicle speed. With this information a variable assist power steering system can provide the optimum input force to output force relationship for a given steering maneuver. Unfortunately, conventional variable assist power steering systems do not take full advantage of this information as input to the electronic control module. The result has been power steering systems that are either inefficient or are slow to provide adequate flow during certain steering maneuvers, resulting in a perceptable increase in effort for a short period of time. For instance, some steering systems provide the full flow of a hydraulic pump to the steering valve, only to limit the hydraulic flow at the valve. This results in greater parasitic losses of the vehicles engine possibly leading to a decrease in potential fuel economy. Accordingly, it will be appreciated that it would be highly desirable to have a power steering system that more efficiently uses the available control inputs to more optimally deliver variable power steering assist without consuming unnecessary energy.

SUMMARY OF THE INVENTION

The present invention is directed to overcoming one or more of the problems set forth above. Briefly summarized, according to one aspect of the present invention, a variable assist power steering system for a vehicle includes a steering gear assembly coupled to a steering wheel to steer the vehicle in response to movement of the steering wheel. The steering wheel is operably connected to a steering valve having an inlet for receiving pressurized fluid for effecting displacement of the steering gear, the steering valve metering the pressurized fluid to the steering gear in response to movement of the steering wheel thereby providing steering assist. A steering pump for providing the pressurized fluid to the steering valve. The system also includes a sensor for sensing vehicle speed and producing a speed signal and a sensor for sensing fluid pressure of the pressurized fluid and producing a pressurized fluid signal and a sensor for sensing steering wheel rate and producing a steering wheel rate signal.

A flow control valve actuator is mounted on the steering pump for diverting flow away from the steering valve and thereby varying steering assist. To control the valve a control module includes a first calibration table containing entries representing actuator current values, inlet pressure and vehicle speed from which it can determine a desired actuator current as a function of inlet pressure and vehicle speed. The control module also includes a second calibration table containing entries representing actuator current values and steering wheel rate from which it determines a required actuator current as a function of steering wheel rate.

Using this information, the control module selects a minimum of the desired current value and the required current value and establishes a final desired current value equal to the minimum. The control module then computes flow control valve actuator commands as a function of the final desired current value and generates an output PWM voltage signal. The control module then outputs the PWM voltage based on the output PWM voltage signal to the flow control valve actuator so as to vary steering assist.

According to another aspect of the invention, a method for providing variable assist power steering by controlling a flow control valve actuator for varying steering assist fluid flow in a power steering system for a vehicle, comprising the steps of sensing vehicle speed; sensing steering assist fluid pressure; sensing steering wheel rate; sensing actual actuator current; setting up a first calibration table containing entries representing desired actuator current, vehicle speed and inlet pressure; setting up a second calibration table containing entries representing required actuator current and steering wheel rate; determining a desired actuator current from the first calibration table as a function of steering assist fluid pressure and vehicle speed and producing a desired current value; determining a required actuator current from the second calibration table as a function of steering wheel rate and producing a required current value; selecting a minimum of the desired current value and the required current value and establishing a final desired current value equal to the minimum; computing flow control valve actuator commands as a function of the final desired current value equal to generating an output PWM voltage signal; and outputting the PWM voltage signal to the flow control valve actuator to vary steering assist.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
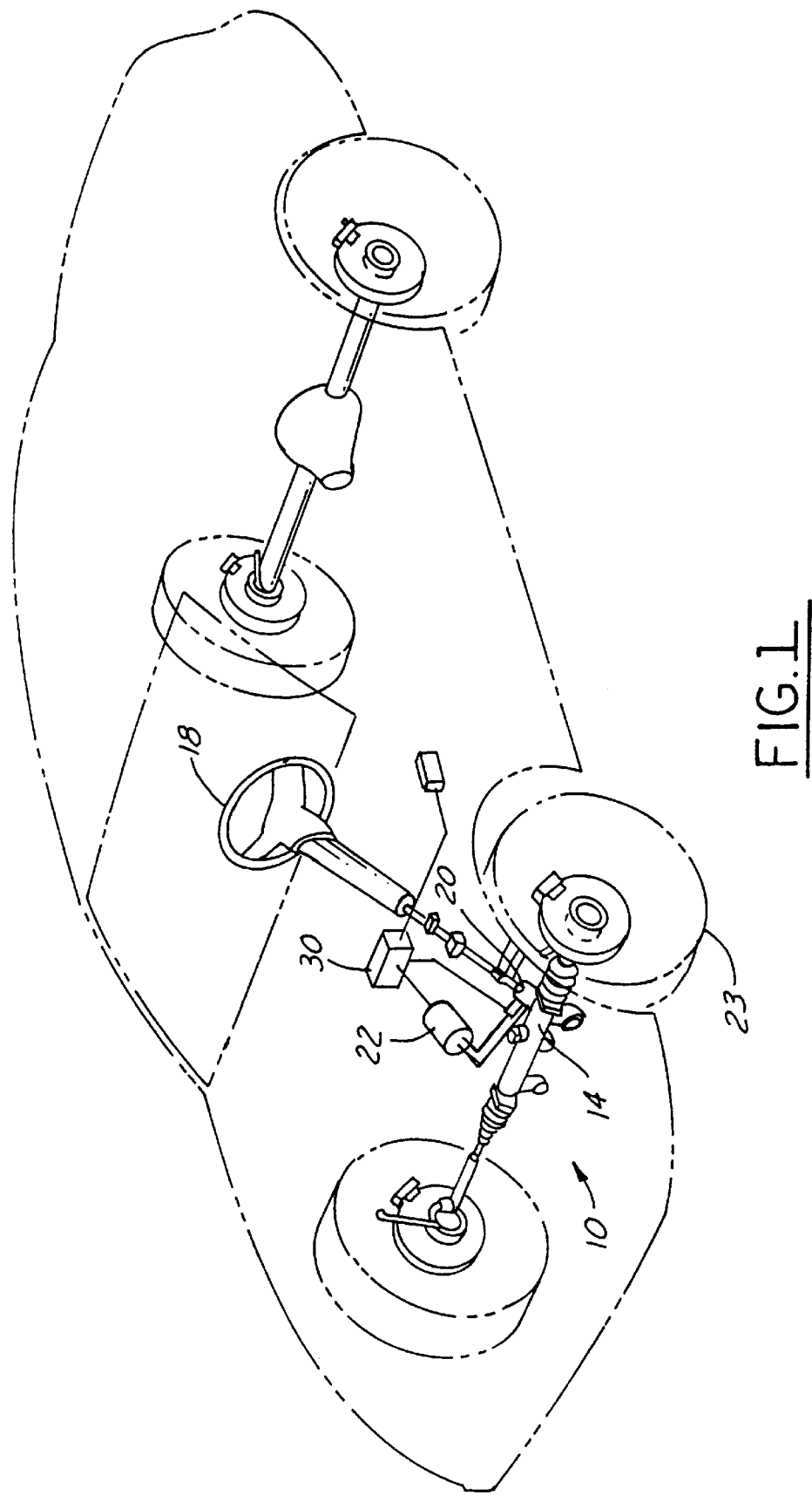
FIG. 1 a diagrammatic perspective view of a vehicle equipped with a variable assist power steering system according to the present invention.
Figure 2:
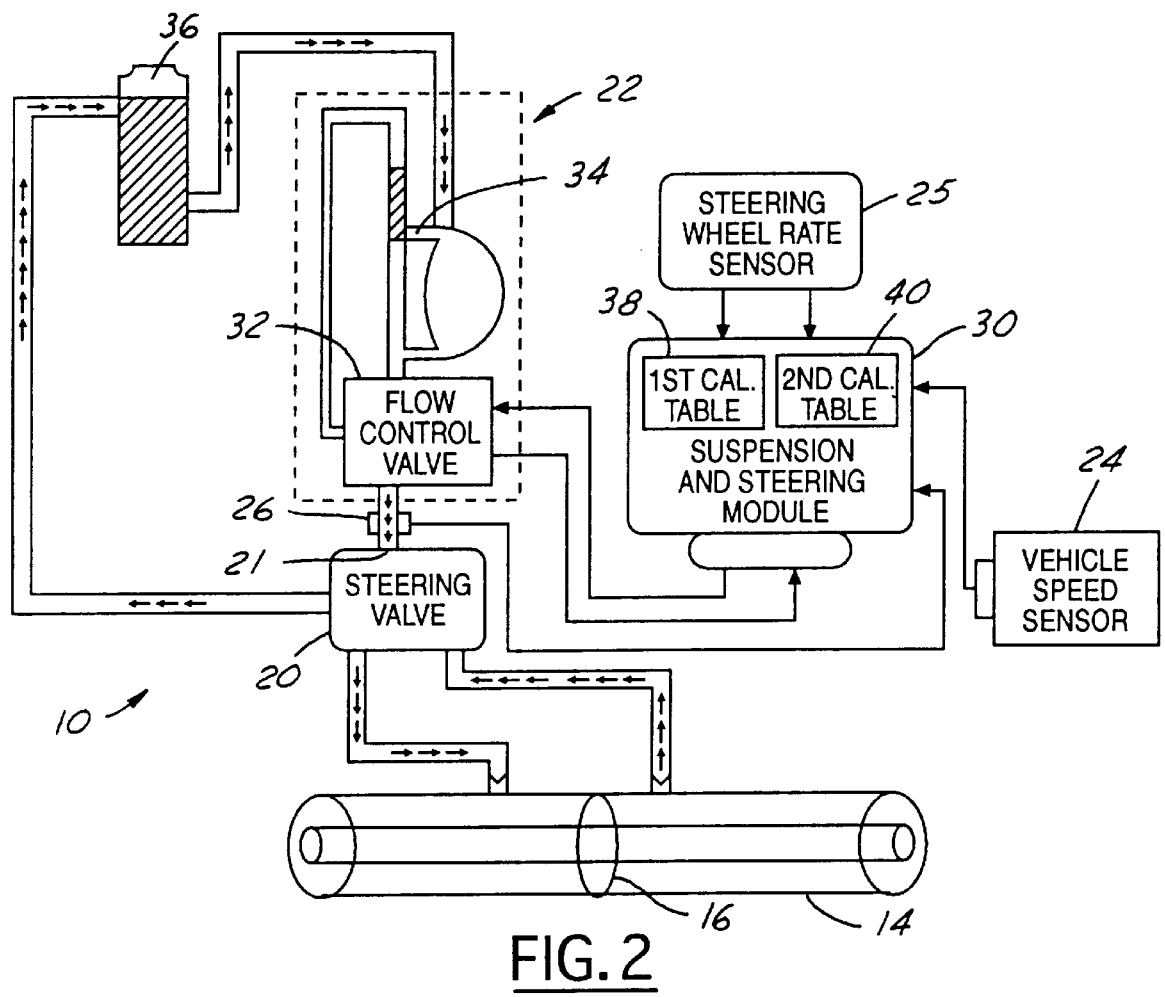
FIG. 2 is a block diagram illustrating the steering system of FIG. 1.

Referring to FIGS. 1–2, a variable assist power steering system 10 for a vehicle has a steering rack assembly 14 that has a piston 16 and is coupled to a steering wheel 18 to steer the vehicle in response to movement of the steering wheel 18. A steering valve 20 has an inlet 21 for receiving pressurized fluid from a pump 22 for effecting displacement of the piston 16 within. As the piston 16 moves, the angle of the front wheels 23 of the vehicle change to alter the path of the vehicle. The steering valve 20 meters fluid to the piston 16 in response to movement of the steering wheel thereby providing steering assist. In effect, the variable assist power steering system multiplies steering wheel torque applied by the driver so that altering the vehicle path is less burdensome to the driver. While the presently preferred embodiment will be described in the context of a rack and pinion steering gear, it should be understood that the present invention applies equally to other types of hydraulically assisted steering systems, including for example those having recirculating ball type steering gears.

The mechanical and hydraulic elements of the steering system are conventional. An example of the hydraulic pump 22 may be found in U.S. Pat. No. 5,029,660 to Raad, et al., issued Jul., 9, 1991 and assigned to the assignee of the present invention. It should be noted that the hydraulic pump can be driven by the engine, or alternatively by an electric motor.

Sensors are used to detect, sense or measure various vehicle operating conditions including vehicle speed, steering wheel rate and fluid pressure. Speed sensor 24 may be of any variety typically used to sense vehicle speed, but a sensor not subject to wheel slip is preferred. A signal generator driven by the power train of the vehicle is one such sensor, and a radar unit is another. Speed sensor 24 forms a means for sensing vehicle speed and producing a vehicle speed signal. A conventional pressure sensor 26 provides a means for sensing steering system fluid pressure at the inlet 21 to the steering valve 20 and producing an inlet fluid pressure signal. It should be noted that there are many equivalent alternatives to sensing pressure for use in the present invention. For instance, it would be functionally equivalent to measure steering torque, differential pressure or steering gear forces instead of inlet pressure, however, these would likely be more costly.

Figure 4:
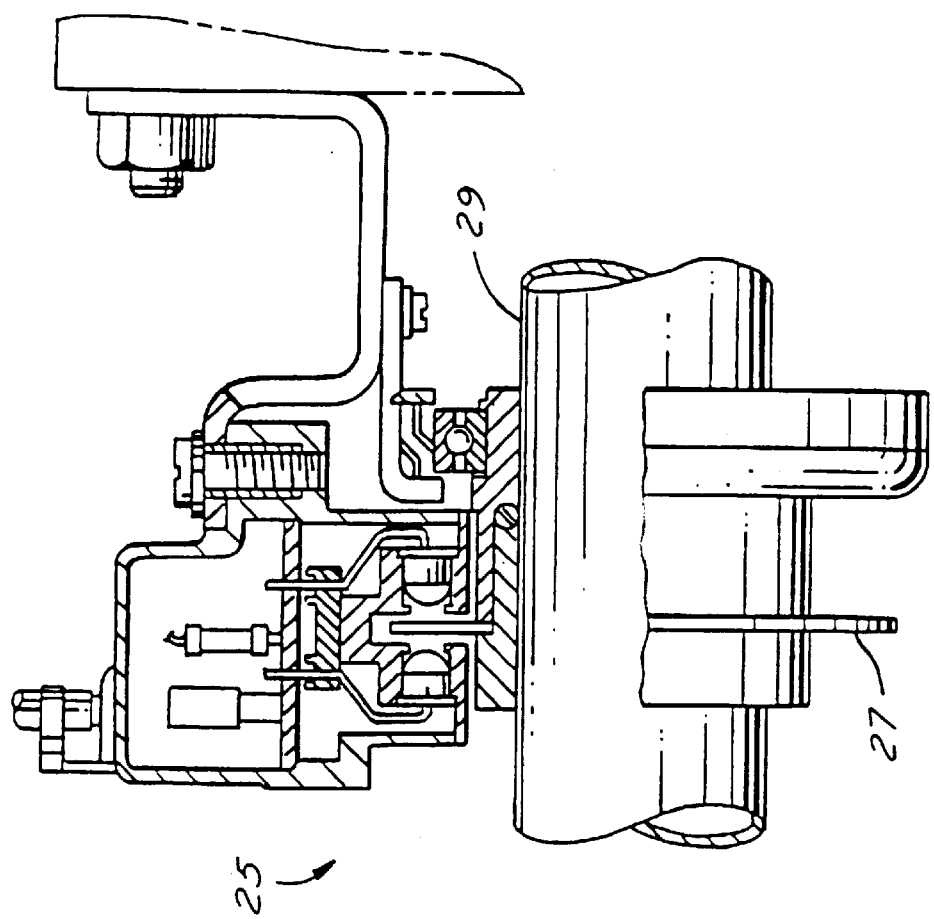
FIG. 4 is a elevational view of a steering wheel rate sensor for use in accordance with the present invention.
Figure 3:
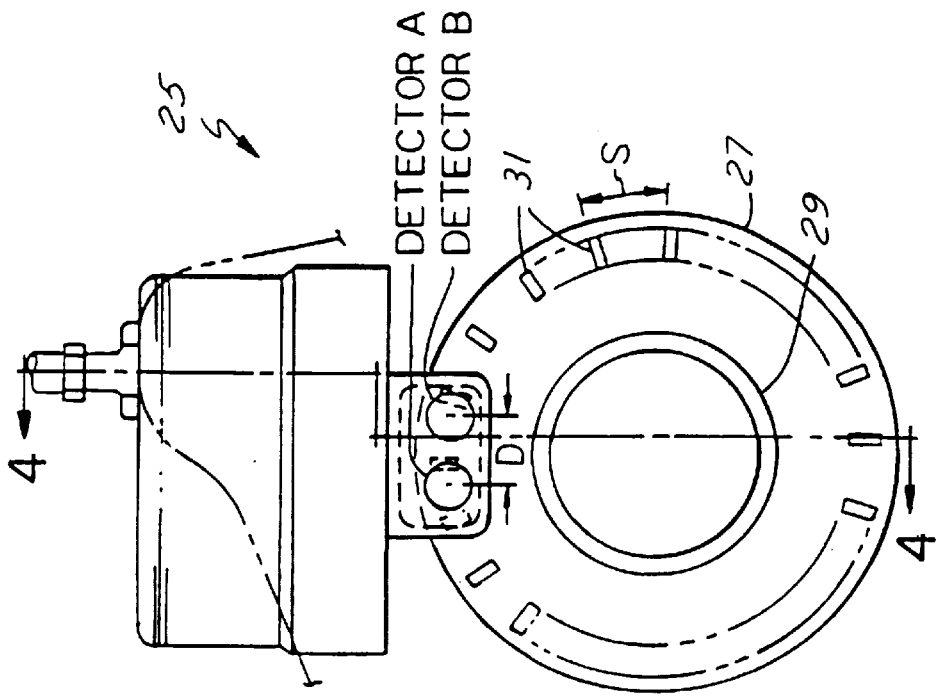
FIG. 3 is a front view of a steering wheel rate sensor for use in accordance with the present invention.

The steering wheel rate sensor 25 is shown in FIGS. 3 and 4. Usage of the illustrated steering wheel sensor is explained in U.S. Pat. No. 4,621,833 to Soltis, issued Nov. 11, 1986, which is assigned to the assignee of the present invention. The steering wheel rate sensor 25 comprises shutter wheel 27, attached to steering shaft 29, which rotates in unison with the steering wheel 18 as the steering wheel is turned by the operator of the vehicle. Shutter wheel 27 has a plurality of apertures 31, in this case 20 in number, which apertures serve to trigger the activity of detectors A and B as the shutter wheel is rotated with the steering system of the vehicle. Because there are 20 apertures contained within shutter wheel 27, the steering wheel sensor 25 provides a signal 80 times during one revolution of the steering wheel and as a result each of the 80 signals or steps indicates 4.5 degrees of rotation of the steering system. It should be recognized that higher resolution may be obtained by increasing the number of apertures.

The outputs of detectors A and B are fed into control module 30 and the steering wheel rate (SWR) is determined by tracking the rotations of the shutter wheel for a predetermined sampling period. Those skilled in the art will appreciate in view of this disclosure that the illustrated steering wheel rate sensor is exemplary of a class of devices which may be used for the purpose of determining the steering wheel rate and for providing a signal representative of the steering wheel rate to the control module.

A controlled flow of hydraulic fluid is supplied to the steering valve 20 from a flow control valve 32. In the preferred embodiment, the flow control valve 32 is integrated within the housing of the pump 22. The pump supplies pressurized hydraulic fluid to the flow control valve 32 which returns a controlled amount of fluid to a pump inlet 34 where it joins fluid supplied from a reservoir 36 to regulate the flow supplied to the steering valve 20, thereby providing variable assist power steering.

The position of the flow control valve 32 is controlled by a linear or current proportional actuator or solenoid (not shown). Preferably, the flow control valve 32 includes a ferro-magnetic plunger movably disposed therein and a coil which is energized with electric current in the form of a final control signal. The amount of current supplied to the flow control valve 32 determines the position of the plunger relative to a flow aperture in direct proportion to the current supplied to the solenoid coil. In the presently preferred embodiment, higher current in the solenoid coil increases the flow bypass, reducing the amount of steering assist provided.

The final control signal is generated by the microprocessor based control module 30 using the inlet pressure signal, the steering wheel rate signal and the vehicle speed signal and outputting a final desired actuator current value as a function of these inputs, vehicle speed, steering wheel angle and inlet pressure.

Figure 6:
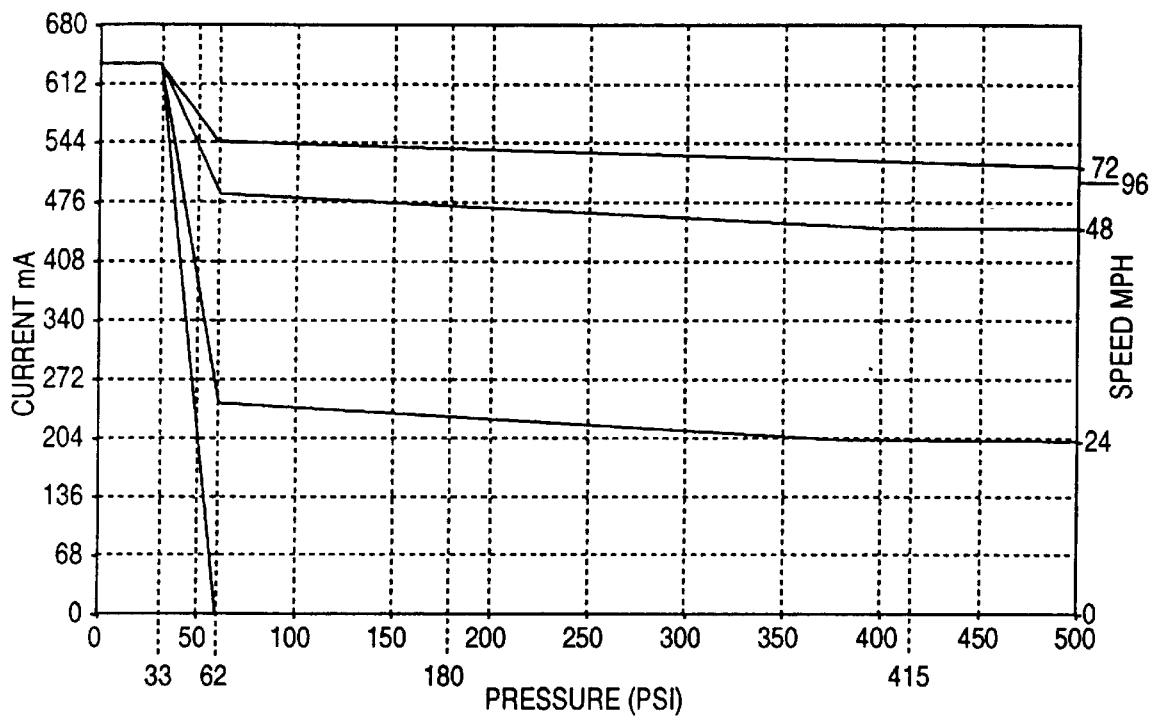
FIG. 6 graphically illustrates a first calibration table wherein actuator current is shown as a function of both vehicle speed and steering system fluid pressure.

Referring now to FIG. 2, the controller 30 includes first and second calibration tables 38,40 containing entries representing actuator current values, inlet pressure values, vehicle speed and steering wheel rate values. FIG. 6 is a graphical representation of the three dimensional relationship between desired actuator current plotted on one axis and inlet pressure plotted on a second axis for several different vehicle speeds represented on a third axis. For any measured value of vehicle speed and inlet pressure, there is an optimum desired actuator current.

The simplest implementation of the three dimensional graph for the bilinear interpolation of desired actuator current versus vehicle speed and pressure requires equally spaced points in both directions, speed and pressure, which would demand extremely large tables for the pressure resolution required. An interpolation table with unequally spaced points could be directly implemented if a fast divide operator was available at reasonable cost, but this is not the case for the inexpensive microprocessors to be used in control module 30 for automotive applications where cost and value must always be considered. Thus, a cost efficient solution is to have equally spaced points versus speed in increments of 24 mph from 0 mph to 96 mph, and to have equally or unequally spaced points versus pressure with the restriction that the distance between any two sequential pressure points be a power of 2 in sensor counts. Powers of 2 in any other units could also be used. This eliminates the need for a divide operator permitting an expensive divide operator to be replaced by much less expensive counted algebraic shifts. Resolution of about 7 psi for table areas with high curvature have been obtained using less than 10 pressure points between 0 psi and 1500 psi because the tables become very flat a high pressures.

Figure 7:
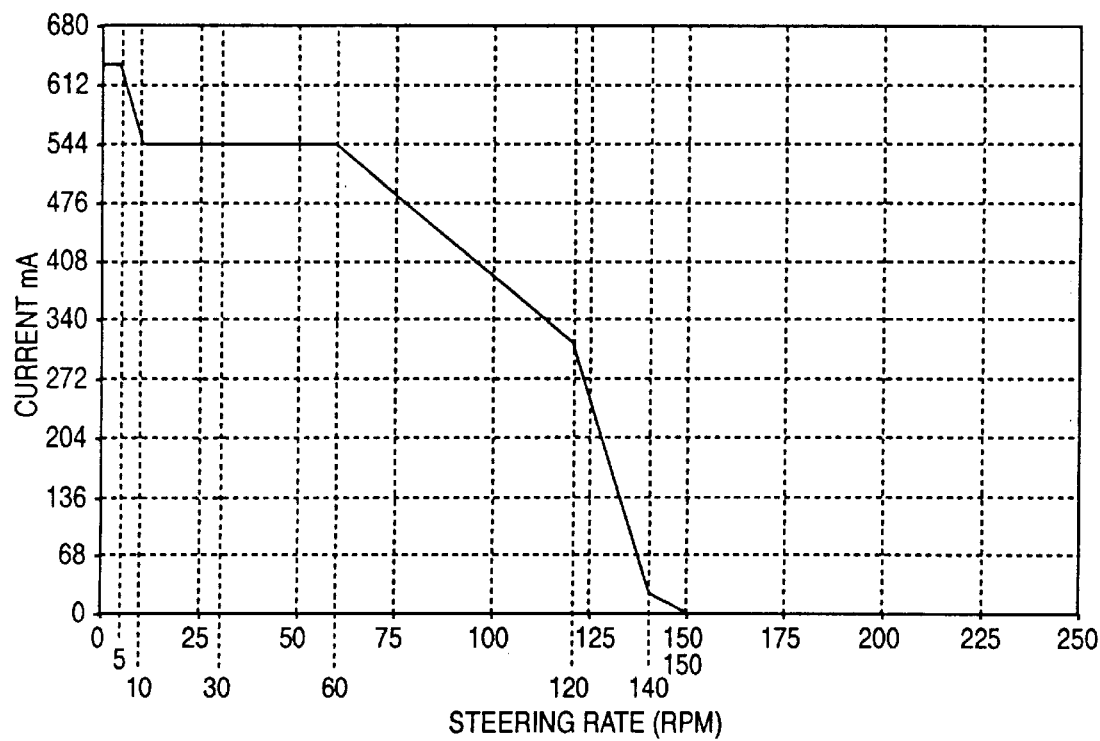
FIG. 7 graphically illustrates a second calibration table wherein actuator current is shown as a function of steering wheel rate.

Similarly, FIG. 7 is a graphical representation of the second calibration table showing two dimensional relationships between required actuator current plotted on one axis and steering wheel rate plotted on a second axis. For any measured value of steering wheel rate there is a minimum required actuator current needed to ensure adequate fluid flow to the steering valve 20. It should be noted that the calibration tables shown in FIGS. 6 and 7 show high current for low pressure, or low assist operation, which reduces pump flow and thus corresponding parasitic losses and energy consumption when no steering assist is required by the vehicle operator.

The variable assist power steering system has the ability to adjust steering efforts based on inlet pressure, steering wheel rate and vehicle speed to reduce pump flow and assist when conditions allow. For instance, when both steering wheel rate and inlet pressure are low, corresponding to straight ahead driving, the pump flow can be reduced, reducing parasite losses and increasing vehicle system efficiency. Several different tables may be preprogrammed and stored in memory in the control module to be selected during vehicle manufacture or while driving.

Figure 5:
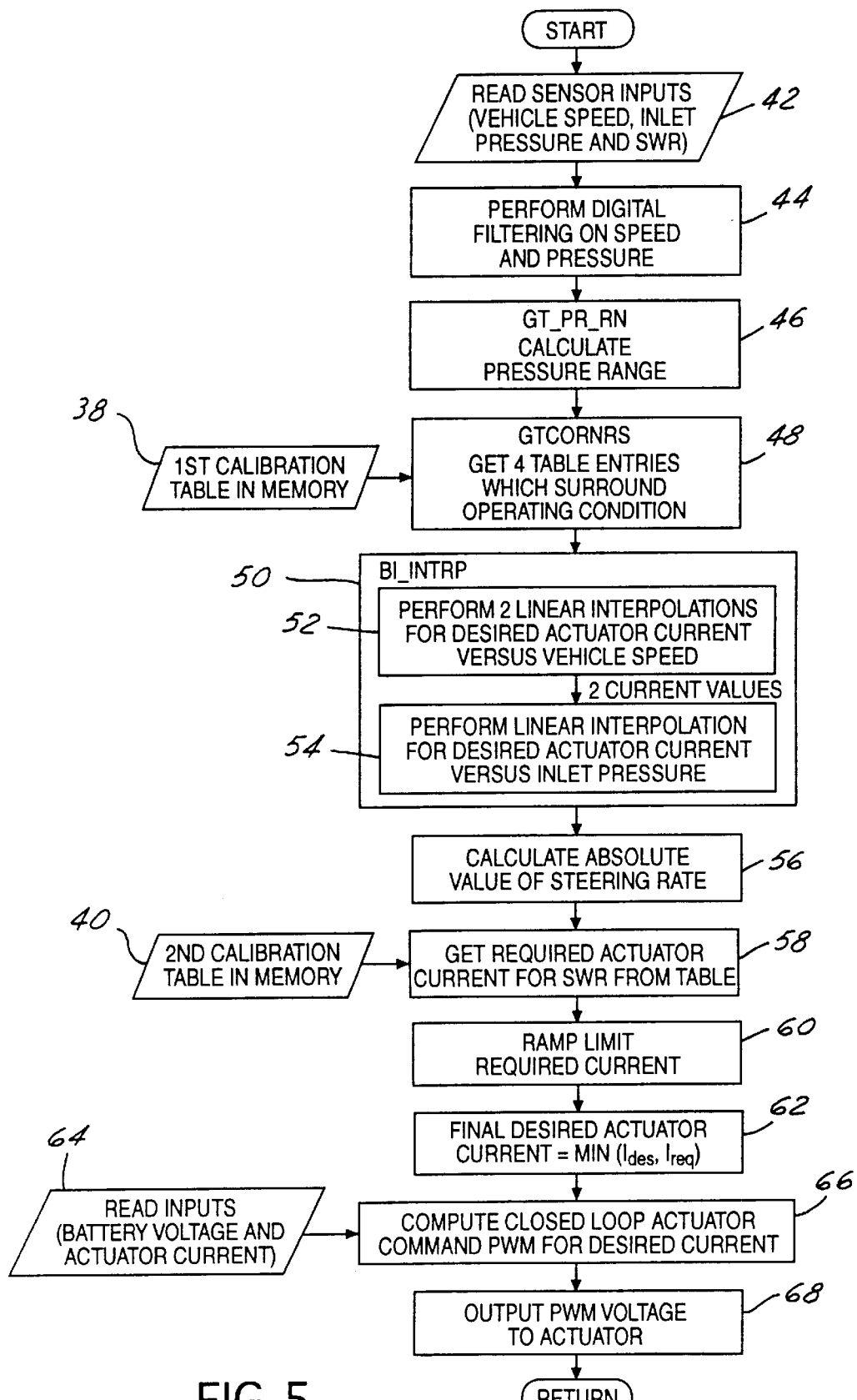
FIG. 5 is a flow chart illustrating a control algorithm for controlling a variable assist power steering system in accordance with the present invention.

FIG. 5 is a flow chart illustrating operation of the variable assist power steering system. The algorithm contains several subroutines that compute and filter vehicle speed, steering wheel rate and inlet pressure. It determines which range the measured pressure is in, modifies speed input to the table, and gets the four values of current bounding the present speed and pressure. It then interpolates the four values and generates the desired actuator current value. The algorithm then determines the required actuator current for the present steering wheel rate and compares it with the desired actuator current, setting the minimum value as the final desired current to ensure sufficient flow of steering fluid to the steering valve 20.

For illustration, assume a 5 by 10 speed by pressure table. At start up, the vehicle speed and inlet pressure signals are read at block 42, along with other system inputs, and conditioned and filtered at block 44. The first calibration table is called up. At block 46 subroutine GTPRRN gets the pressure range. It determines which range the measured pressure is in relative to the present first calibration table 38 pressure points. For example, for 10 pressure points, there are 11 pressure ranges, 0 through 10, with pressure range 0 existing where the sensed pressure is less than the first pressure point; that is:

sensed pressure ≤ $X(1)$ = pressure range 0, where $X(1)$ is the first pressure point. Similarly, $X(1)$ < sensed pressure ≤ $X(2)$ = pressure range 1;

and $X(10)$ < sensed pressure = pressure range 11, where $X(2)$ is the second pressure point and $X(10)$ is the highest pressure point.

At block 48 subroutine GTCORNRS gets the four corners that are values of actuator current from the first calibration table that bound the present speed and pressure operating point. The pressure point falls into one of the 11 pressure ranges, and the speed point falls into one of the 6 speed ranges.

At block 50 subroutine BIINTRP performs bilinear interpolation of the desired actuator current values between the four corner points obtained at block 48. It performs two linear interpolations of desired actuator current values versus speed first at block 52, then linearly interpolates between these two desired actuator current values using pressure at block 54. Where pressure is in pressure range 0 or pressure range 11, then no interpolation over pressure is required. Calculations are performed in unsigned 8-bit arithmetic, instead of signed 8-bit, to maintain maximum resolution. Preferably, rounding is performed after all shift rights or division by $2^n$. The output is the desired actuator current for the inlet pressure and vehicle speed.

At block 56 the absolute value of the steering wheel rate is found. At block 58 it gets the required actuator current value from the second calibration table 40 for the present steering wheel rate. At block 60, the required actuator current value is ramp limited to prevent undesirable and noticeable changes in steering assist. In its simplest form, the ramp limit is only applied to increasing values of current. For example, if the difference between the required actuator current and the present actual actuator current is less than or equal to a predetermined ramp limit value, then no limiting is necessary. Otherwise, if the difference exceeds the ramp limit value, the required actuator current is set equal to the sum of the actual actuator current and the ramp limit value. It should be recognized that this example is simplified and it may be desirable to have ramp limiting on decreasing and increasing current values, with the ramp limit values for each possibly being different.

At block 62 the final desired actuator current is set equal to the minimum of either the desired actuator current or the required current. This is then input to block 66 which generates the commanded actuator current from the final desired actuator current and other inputs from block 64 such as vehicle battery voltage and actual actuator current. Closed loop actuator command PWM for desired current is computed and output to block 68 where the output PWM voltage is applied to the flow control valve actuator to vary steering assist.

While the invention has been described with particular reference to the preferred embodiments, it will be understood by those skilled in the art that various changes may be made and equivalents may be substituted for elements of the preferred embodiments without departing from invention. For example, the calibration table need not have equal speed ranges in increments of 24 mph up to 96 mph. There may be equal ranges up to an upper limit based on highway speed limits and a single range above that with minimal power steering assist. This would allow smaller increments than 24 mph or fewer speed points to simplify the table. The pressure points can be equally or unequally spaced as long as the difference between adjacent points is a power of two in some arbitrary set of units. Additionally, there are no restrictions on speed or pressure point separation for implementation of the basic algorithm, but implementing the basic algorithm as specified minimizes the cost and speed of implementation. It is accordingly intended that the claims shall cover all such modifications and applications as do not depart from the true spirit and scope of the invention.

What is claimed is:

1. A method for providing variable assist power steering by controlling a flow control valve actuator for varying steering assist fluid flow in a power steering system for a vehicle, comprising the steps of:

sensing vehicle speed;

sensing steering assist fluid pressure;

sensing steering wheel rate;

sensing actual actuator current;

setting up a first calibration table containing entries representing desired actuator current, vehicle speed and inlet pressure;

setting up a second calibration table containing entries representing required actuator current and steering wheel rate;

determining a desired actuator current from said first calibration table as a function of steering assist fluid pressure and vehicle speed and producing a desired current value;

determining a required actuator current from said second calibration table as a function of steering wheel rate and producing a required current value;

selecting a minimum of said desired current value and said required current value and establishing a final desired current value as said minimum;

computing flow control valve actuator commands as a function of said final desired current value and generating an output PWM voltage signal; and outputting said PWM voltage signal to said flow control valve actuator to vary steering assist.

2. The method of claim 1 wherein the step of determining a required actuator current from said second calibration table as a function of steering wheel rate and producing a required current value further includes limiting changes of said required current value within a predetermined rate of change.

3. A variable assist power steering system for a vehicle, comprising:

a steering gear assembly coupled to a steering wheel to steer said vehicle in response to movement of said steering wheel;

a steering valve having an inlet for receiving pressurized fluid for effecting displacement of said steering gear, said steering valve metering said pressurized fluid to said steering gear in response to movement of said steering wheel thereby providing steering assist;

a steering pump for providing said pressurized fluid for said steering valve;

means for sensing vehicle speed and producing a speed signal;

means for sensing fluid pressure of said pressurized fluid and producing a pressurized fluid signal;

means for sensing steering wheel rate and producing a steering wheel rate signal;

a flow control valve actuator mounted on said steering pump for diverting flow away from said steering valve and thereby varying steering assist;

a first calibration table containing entries representing actuator current values, inlet pressure and vehicle speed;

means for determining a desired actuator current from said first calibration table as a function of inlet pressure and vehicle speed and producing a desired current value;

a second calibration table containing entries representing actuator current values and steering wheel rate;

means for determining a required actuator current from said second calibration table as a function of steering wheel rate and producing a required current value;

means for selecting a minimum of said desired current value and said required current value and establishing a final desired current value as said minimum;

means for computing flow control valve actuator commands as a function of said final desired current value and generating an output PWM voltage signal; and means for outputting PWM voltage based on said output PWM voltage signal to said flow control valve actuator so as to vary steering assist.

4. The power steering system according to claim 3, whereby said means for determining a required actuator current from said second calibration table as a function of steering wheel rate and producing a required current value further includes ramp limiting means for limiting changes of said required current value within a predetermined rate of change.

5. A variable assist power steering system for a vehicle, comprising:

a steering rack assembly having a piston and being coupled to a steering wheel to steer said vehicle in response to movement of said steering wheel;

a steering valve having an inlet for receiving pressurized fluid for effecting displacement of said piston, said steering valve metering fluid to said piston in response to movement of said steering wheel thereby providing steering assist;

a steering pump for providing pressurized fluid for said steering valve;

means for sensing vehicle speed and producing a speed signal;

means for sensing fluid pressure at of said pressurized fluid and producing a pressurized fluid signal;

means for sensing steering wheel rate and producing a steering wheel rate signal;

a flow control valve actuator mounted on said steering pump for diverting flow away from said steering valve and thereby varying steering assist;

a first calibration table containing entries representing actuator current values, inlet pressure and vehicle speed;

means for determining a pressure range into which inlet pressure falls as indicated by said inlet pressure signal;

means for determining a speed range into which vehicle speed falls as indicated by said vehicle speed signal;

means for obtaining first calibration table entries bounding said speed and pressure ranges and producing four current values;

means for performing two linear interpolations on said current values for desired actuator current as a function of vehicle speed and producing two current values;

means for performing a linear interpolation on said two current values for desired actuator current as a function of inlet pressure and producing a desired current value;

a second calibration table containing entries representing actuator current values and steering wheel rate;

means for determining a steering wheel rate range into which steering wheel rate falls as indicated by said steering wheel rate signal;

means for obtaining second calibration table entries bounding said steering wheel rate range and producing two current values;

means for performing a linear interpolation on said two current values for required actuator current as a function of steering wheel rate and producing a required current value;

means for comparing said desired current value and said required current value and establishing as a final desired current value a minimum magnitude of said desired current value and said required current value;

means for computing flow control valve actuator commands as a function of said final desired current value and generating an output PWM voltage signal; and means for outputting PWM voltage based on said output PWM voltage signal to said flow control valve actuator so as to vary steering assist.

6. The power steering system according to claim 5, whereby said means for performing a linear interpolation on said two current values for required actuator current as a function of steering wheel rate and producing a required current value further includes ramp limiting means for limiting changes of required current value within a predetermined rate of change.

* * * * *